June 12, 1951 V. L. HOLDAWAY 2,556,692

VARIABLE GAIN AMPLIFYING SYSTEM

Filed Jan. 29, 1949

INVENTOR
V. L. HOLDAWAY
BY
G. H. Heydt
ATTORNEY

Patented June 12, 1951 2,556,692

UNITED STATES PATENT OFFICE 2,556,692

VARIABLE GAIN AMPLIFYING SYSTEM

Vivian L. Holdaway, Midland Park, N. J., assignor to Bell Telephone Laboratories, Incorporated, New York, N. Y., a corporation of New York Application January 29, 1949, Serial No. 73,501

4 Claims. (Cl. 179—171)

This invention relates to amplifying systems and more particularly to amplifying systems of the volume expander type wherein the amount of volume expansion is controlled or limited.

In accordance with the general features of this invention which comprises a main amplifier and an expansion control network including a side or control amplifier, overload or distortion conditions are not allowed to be set up in the main amplifier by automatically limiting the control voltage delivered by the control network to a value which will not permit the bias potential of the main amplifier control grid to become positive with respect to the cathode.

Figure 1:
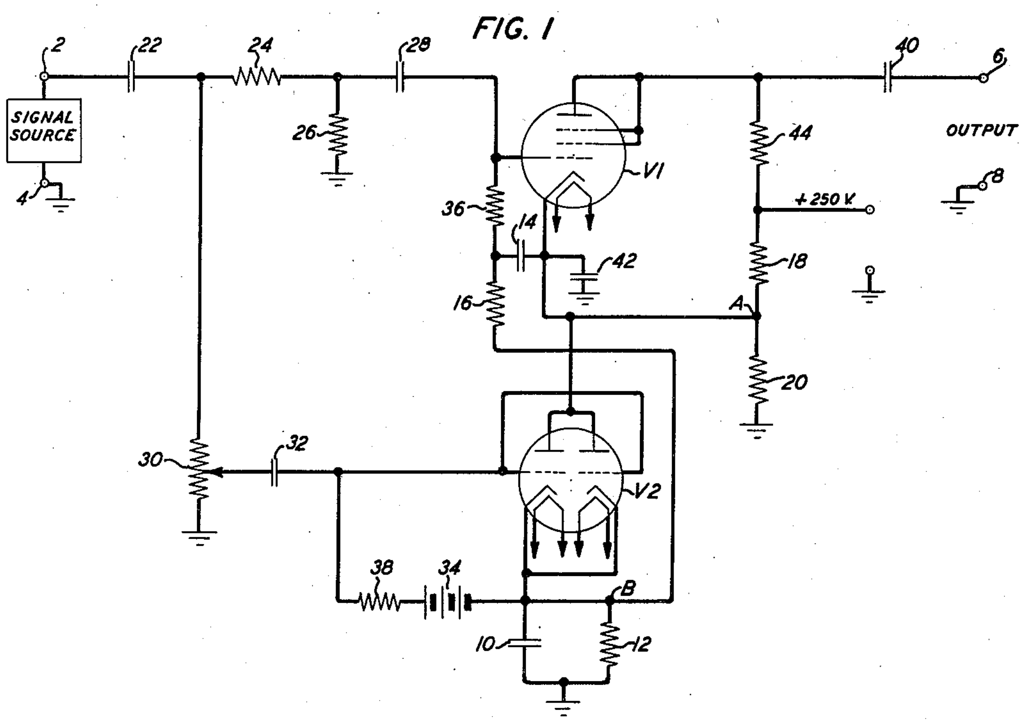
Figure 2:
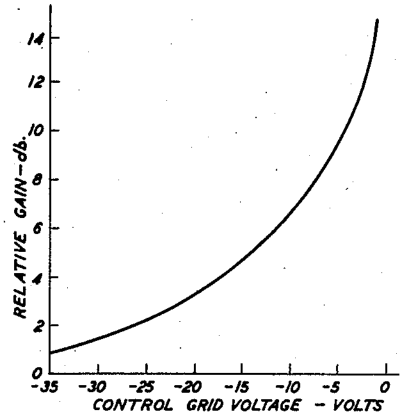

The nature of the invention and its distinguishing features and advantages will be more clearly understood from the following detailed description and the accompanying drawings in which:

Fig. 1 illustrates diagrammatically a specific embodiment of the present invention, and Fig. 2 illustrates the relative gain characteristic of a typical electron tube employed as the main amplifier.

Referring to Fig. 1 of the drawings, a signal wave is fed through the input terminals 2 and 4 to the control grids of the main amplifier V1 and the control or side amplifier V2. The output voltage of amplifier V1 is fed to the output terminals 6 and 8, while the output voltage of the side amplifier is fed through two resistance-capacity networks comprising the components 10, 12, 14 and 16 to the control grid of the amplifier V1. The cathode of the main amplifier V1 and the anode of the side amplifier V2 are connected to the positive side of a source of potential. The potential provided at point A on the voltage divider comprising resistors 18 and 20 is applied to the cathode of amplifier V1 and to the anode of amplifier V2. However, the potential for the anode of amplifier V2 may be obtained from the potential source at some point other than point A which will provide a potential lower than that provided at point A. The input waves are fed to amplifier V1 through a path including coupling condenser 22, the voltage divider comprising resistors 24 and 26, and the coupling condenser 28; and to amplifier V2 through a path including the expansion control potentiometer 30 and the coupling condenser 32. Bias potential for the control grid of amplifier V2 is supplied by the battery 34. Components 36 and 38 are employed as grid resistors, components 40 and 42 are conventional output coupling and by-pass condensers respectively, and component 44 is the plate load resistor for amplifier V1.

By way of example for the specific embodiment of the invention shown in Fig. 1, the space discharge devices V1 and V2 may be of any suitable types such as the conventional 6K7 and 6F8G tubes respectively, and the resistors and condensers may have the values listed below:

| Resistor | Megohm | Condenser | Micro-farads |
|---|---|---|---|
| 12 | 1.000 | 10 | .10 |
| 16 | .500 | 14 | .25 |
| 18 | .025 | 22 | .10 |
| 20 | .003 | 28 | .05 |
| 24 | .750 | 32 | .10 |
| 26 | .250 | 40 | .10–.25 |
| 30 | .500 | 42 | 40.0 |
| 36 | 1.000 | | |
| 38 | .100 | | |
| 44 | .020 | | |

The operation of the system is as follows: The main amplifier V1 is operated as a triode and the bias potential applied to its control grid is determined by the potential at point A on the voltage divider comprising resistors 18 and 20 across the 250 volts supply. By way of example for the specific embodiment shown in Fig. 1 this initial bias potential may be some value between minus 25 and minus 30 volts. When no signal is fed to amplifiers V1 and V2 at the input terminals 2 and 4, no current will flow through the cathode load resistor 12 of side amplifier V2. The point B will therefore remain at substantially ground potential, holding the control grid of amplifier V1 at ground potential and causing the effective grid bias potential of amplifier V1 to be that of point A. Amplifier V2 is preferably but not necessarily biased at cut-off. As the signal fed to amplifiers V1 and V2 at points 2 and 4 is increased amplifier V2 will, if biased at cutoff, conduct on positive swings only and the output of V2 will appear across the resistance-capacity network comprising condenser 10 and resistor 12. Point B will be driven positive above ground thereby raising the control grid potential of V1 above ground. The effective grid bias potential of amplifier V1 will be decreased and the gain of V1 will be increased in accordance with the characteristic shown in Fig. 2. It is apparent that the potential of point B can approach but can never exceed the potential of point A. Amplifier V1 will therefore always operate on the negative bias range and the overload or distortion conditions ordinarily caused by a positive grid bias will be nonexistent. Since it is possible for point B to approach within one or two volts of point A the maximum signal drive on amplifier V1 is held below this value.

While the invention is presently incorporated in the embodiment shown, it is not intended that it be limited thereto. Other arrangements or forms may be devised by those skilled in the art without departing from the spirit and scope of the invention.

What is claimed is:

1. A variable gain amplifier including a main amplifier comprising a control grid, a cathode, input and output terminals, a control amplifier comprising an anode, a control grid and a cathode, said control grid and the control grid of said main amplifier being connected to the same one of said input terminals, and a potential source, wherein the cathode of said control amplifier is connected to the control grid of said main amplifier and through a resistor to the negative side of said potential source, and the cathode of said main amplifier and the anode of said control amplifier are connected to the same point on the positive side of said potential source.

2. A variable gain amplifier including a main amplifier comprising a control grid, a cathode, input and output terminals, a control amplifier comprising an anode, a control grid and a cathode, said control grid and the control grid of said main amplifier being connected to the same one of said input terminals, and a potential source, wherein the cathode of said control amplifier is connected to the control grid of said main amplifier and through a resistor to the negative side of said potential source, and the cathode of said main amplifier and the anode of said control amplifier are so connected to the positive side of said potential source that the quiescent anode-cathode potential of said control amplifier will not be greater than the quiescent control grid-cathode potential of said main amplifier.

3. A variable gain amplifying system including a main amplifier comprising a control grid, a cathode, input and output terminals, and adapted to receive and transmit a signal wave through said terminals, a control amplifier comprising an anode, a control grid and a cathode, said control grid and the control grid of said main amplifier being connected to the same one of said input terminals and responsive to said signal wave, and a potential source, wherein said control amplifier is adapted to conduct only during the positive cycle portions of said signal wave, the cathode of said control amplifier is connected to the control grid of said main amplifier and through a resistor to the negative side of said potential source, and the cathode of said main amplifier and the anode of said control amplifier are connected to the same point on the positive side of said potential source.

4. A variable gain amplifying system including a main amplifier comprising a control grid, a cathode, input and output terminals, and adapted to receive and transmit a signal wave through said terminals, a control amplifier comprising an anode, a control grid and a cathode, said control grid and the control grid of said main amplifier being connected to the same one of said input terminals and responsive to said signal wave, and a potential source, wherein said control amplifier is adapted to conduct only during the positive cycle portions of said signal wave, the cathode of said control amplifier is connected to the control grid of said main amplifier and through a resistor to the negative side of said potential source, and the cathode of said main amplifier and the anode of said control amplifier are so connected to the positive side of said potential source that the quiescent anode-cathode potential of said control amplifier will not be greater than the quiescent control grid-cathode potential of said main amplifier.

VIVIAN L. HOLDAWAY.

REFERENCES CITED

The following references are of record in the file of this patent:

UNITED STATES PATENTS

| Number | Name | Date |
|---|---|---|
| 2,069,809 | Armstrong | Feb. 9, 1937 |
| 2,313,122 | Brubaker | Mar. 9, 1943 |